United States Patent Office 3,232,402
Patented Feb. 1, 1966

3,232,402
STEPWISE OPERABLE POWER ROLL
Rolf Koenen, Cologne-Hohenhaus, and Otto Winter and Hans Eichemeyer, Wilhelmshaven, Germany, assignors to Olympia Werke AG., Wilhelmshaven, Germany
Filed Apr. 10, 1964, Ser. No. 358,811
Claims priority, application Germany, Apr. 10, 1963, O 9,337
16 Claims. (Cl. 197—17)

The present invention relates to a stepwise operable power roll for driving the type actions and similar devices of a typewriter, and more particularly to a power roll having teeth spaced the same angular distance in circumferential direction, and to a mechanism by which the power roll is driven an angular distance corresponding to the spacing between adjacent teeth for operating a type action, and is then stopped.

Power rolls with angularly spaced teeth have certain advantages over cylindrical power rolls since they assure reliable and positive engagement of the movable interponent element by which the power roll is connected with the type action. On the other hand, cylindrical rubber covered power rolls which frictionally engage eccentric interponent elements avoid the impact of the teeth of the power roll on the interponent element and operate more quietly.

Since only one tooth of the power roll is required for actuating the interponent element, a continuous rotation of the toothed power roll is not necessary, and it is sufficient to turn a toothed power roll only through the angular distance between two adjacent teeth.

It is one object of the present invention to provide a toothed power roll which is stepwise operable to perform each time a key of the typewriter is actuated, an angular turning movement sufficient to displace a tooth thereof such a distance as to actuate an interponent element connecting the power roll with a type action or like device of the typewriter.

Another object of the invention is to provide a power roll arrangement in which the power roll is stepwise turned and stops every time in a position in which a tooth thereof is closely spaced from the interponent element so that upon the next following actuation of a key, the interponent element is immediately engaged and actuated by the respective tooth of the power roll.

Another object of the present invention is to provide a coupling means for coupling a drive shaft with a power roll for limited angular movement in such a manner that the coupling engagement is accomplished without any hard impact.

With these objects in view, the present invention provides coupling means for connecting a motor-driven drive shaft with a power roll having circumferentially spaced teeth. The coupling means are moved to a coupling position by operation of keys, preferably through the intermediary of electromagnetic means, and are automatically shifted from the coupling position to the disengaged position when the power roll has turned through a predetermined angular distance required for actuating a movable element by which a type action, or similar device, is operated.

In the preferred embodiment of the invention, the coupling means include a part secured to the continuously rotating drive shaft, another part secured to the power roll, and a movable pawl which has a coupling position engaging teeth on the coupling part on the drive shaft. The coupling pawl is operated by control means including a stepping wheel and a control member which is adapted to shift the coupling pawl. The stepping wheel cooperates with blocking means which are released by electromagnetic means under the control of key switches, and upon release of the blocking means, the control member permits the coupling means to assume the coupling position whereupon the stepping wheel turns with the power roll until again stopped by the blocking means engaging the next following tooth of the stepping wheel. Thereupon, the control member shifts the coupling pawl to a position in which the coupling is disengaged, and the power roll can be stopped by a stop means engaging a toothed stop wheel secured to the power roll.

While pneumatic or hydraulic means may be used for controlling the blocking means upon manual operation of a key of the keyboard of the typewriter, it is preferred to use an electromagnetic means and switches operated by the keys. The same key which causes release of the coupling mechanism by the blocking means, also causes energization of an electromagnetic means by which the interponent element is moved to an operative position cooperating with the actuated power roll so that the respective type action is actuated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
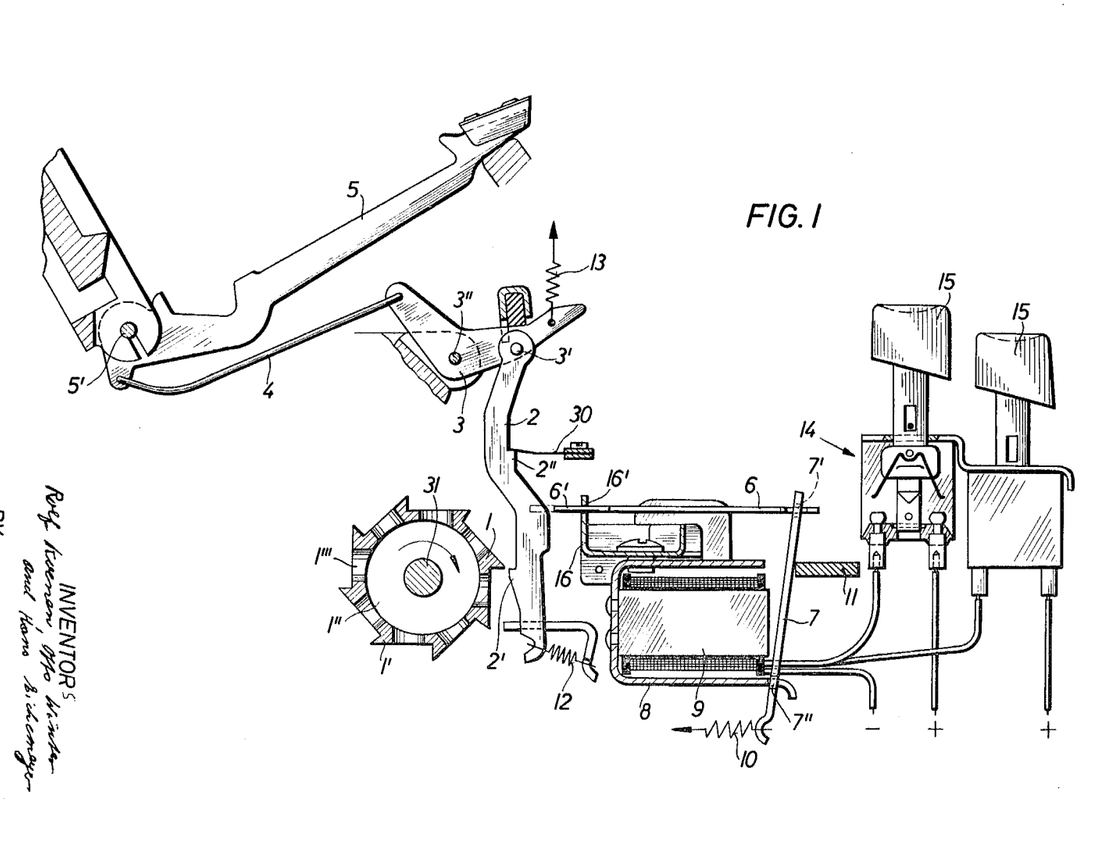
FIG. 1 is a fragmentary cross sectional view illustrating a device for actuating a type action by a power roll.
Figure 2:
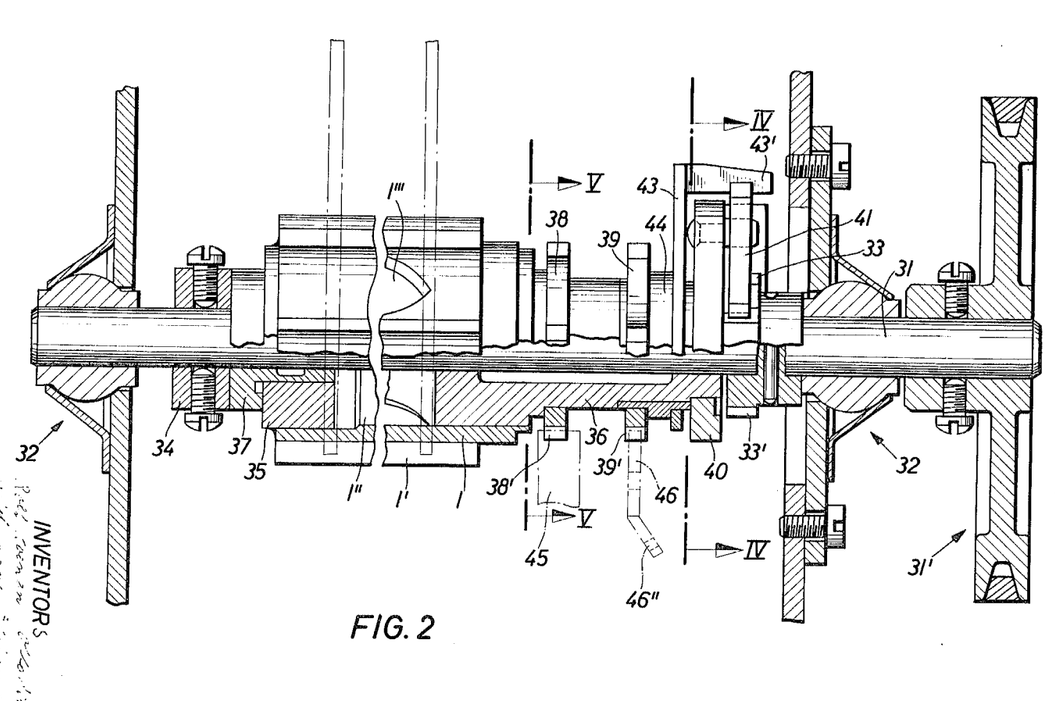
FIG. 2 is a front view, partially in section, and illustrating one embodiment of the invention.

Referring now to the drawings, and more particularly to FIGS. 1 and 2, a power roll 1 has eight circumferentially spaced radially projecting teeth 1' and surrounds a shaft 31 which is continuously driven by a motor, not shown, connected by a V-belt with a pulley 31' fixed to shaft 31. Power roll 1 has a longitudinal bore 1'', and transverse openings 1''' so that the mass of the power roll is reduced to a minimum, and comparatively small forces are required for acceleration and deceleration of the power roll. The power roll is normally at a standstill, but can be coupled to the drive shaft 31 to move through an angular distance which is one eighth of 360° so that after each angular turning movement, the teeth of the power roll will be in the same relative position to a movable interponent element 2, and more particularly in a position in which a tooth 1' is located slightly above a shoulder of a projection 2' of element 2. Element 2 is pivotally mounted on a pin 3' carried by a double-armed angular lever 3 which is supported on the frame by a shaft 3''. A spring 13 urges lever 3 to the position illustrated in FIG. 1 in which a leaf spring 30 abutting a shoulder 2'' prevents further upward movement of element 2. A spring 12 is secured to a frame part and to element 2, and tends to hold the same in the illustrated position. A wire link 4 connects lever 3 with a type bar 5 which is mounted on a shaft 5' in the type segment of the machine. Only one type action is illustrated in FIG. 1, but it will be understood that the row of type actions is provided, each of which may be actuated when the respective element 2 is moved into operative engagement with the power roll 1. Each type action is assocated with a key 15 and with a switch 14 controlled by key 15. Upon actuation of any key, an electromagnetic means 8 is energized so that the armature 7 which is mounted for turning movement on a fixed yoke 8, is turned in counterclockwise direction against the action of a spring 10 and moves a member 6 which is pivotally connected to member 7 by a joint 7', in horizontal direction to the left as viewed in FIG. 1 to the position illustrated in chain lines so that the respective element 2 is turned about pivot 3' and moves to a position in which the shoulder of projection 2' is located directly underneath the shoulder of the respective tooth 1'. Key-operated switch also causes energization of another electromagnetic means, as will be described hereinafter, which causes a coupling engagement between drive shaft 31 and power roll 1 for a limited angular distance corresponding to the angular spacing between two teeth 1' so that the type action is actuated and type bar 5 moved toward the platen of the typewriter.

The coupling arrangement of the present invention will now be described with reference to FIGS. 2 to 5. As best seen in FIG. 2, the drive shaft 31 is mounted in bearings 32 on the frame of the machine, and is continuously rotated by a motor through pulley 31'. A toothed coupling member 33 having ratchet teeth 33' is secured to shaft 31 by a pin, and rotates with the same. Another coupling member 40 is secured to a bushing 36 which has an inner bearing receiving shaft 31, and is secured to the tubular wall of the hollow power roll 1. The other end of power roll 1 is secured to an inner ring 35 holding a bearing bushing 37 through which shaft 31 passes. An end ring 34 is secured to shaft 31 and prevents axial movement of the power roll assembly. Power roll 1 is illustrated in FIG. 2 with most of its center portion broken away, and it will be understood that the power roll has the conventional length required for cooperation with a row of elements 2, two of which are illustrated in phantom lines in FIG. 2.

Figure 4:
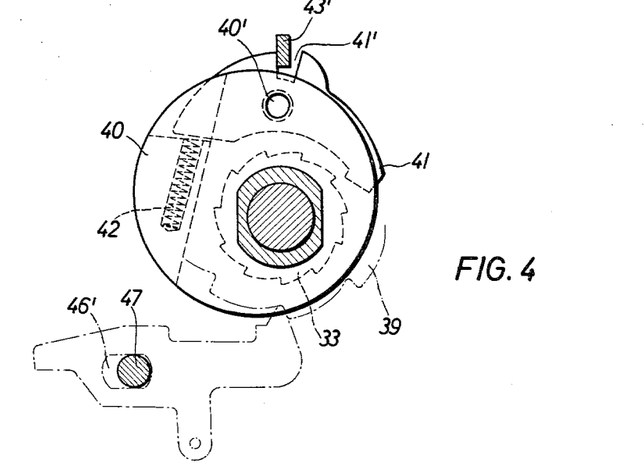
FIG. 4 is a fragmentary cross sectional view taken on line IV—IV in FIG. 2.

As best seen in FIG. 4, coupling member 40 carries a fixed pivot pin 40' on which a movable part or pawl 41 is mounted for angular movement between the inoperative position shown in FIG. 4, and an operative position engaging the teeth of the tooth coupling member 33 so that coupling members 33 and 40, and consequently shaft 31 and power roll 1, are coupled to each other for rotation.

Figure 3:
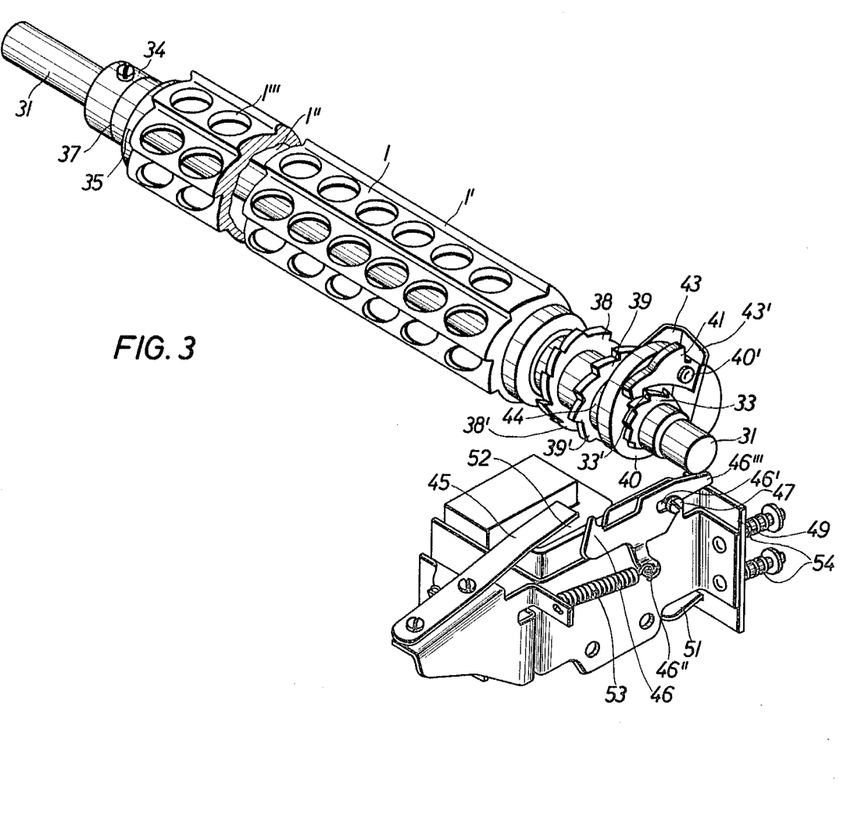
FIG. 3 is a fragmentary perspective view on a reduced scale illustrating the embodiment of FIG. 2.

The bushing 36 has a toothed stop wheel 38 secured thereto, whose teeth 38' have a shape as to be effective in one direction of rotation, and cooperate with a resilient stop 45, best seen in FIGS. 3 and 4, which is mounted on the frame of the machine. Stop 45 will block stop wheel 38 and thereby power roll 1 in one direction of rotation, but will permit rotation in the opposite direction due to its resiliency.

A control means including a hub 44, a toothed wheel 39, and a control member 43, 43' is mounted on bushing 36 for turning movement. The transverse portion 43' of control member 43 is located in a cutout 41' of pawl 41 which is urged by a spring 42 to turn to the operative coupling position engaging the teeth of coupling member 33, but is normally prevented from such movement by the projection 43' of control member 43, since the toothed wheel 39 of the control means is normally blocked by a blocking member 46. Blocking member 46 is mounted on a stud 47 which projects into an elongated slot 46' of blocking member 46. Consequently, blocking member 46 is not only turnable between a blocking position engaging toothed wheel 39 and a releasing position spaced from the same, but is also longitudinally shiftable in the direction of slot 46'. A spring 48 is secured to an arm 46" of blocking member 46 and also to a fixed point, and urges blocking member 46 to the left as viewed in FIG. 3, and to the right as viewed in FIG. 5, and at the same time spring 48 biases blocking member 46 to turn in counterclockwise direction as viewed in FIGS. 4 and 5 into a position engaging and blocking toothed wheel 39 so that the control means 39, 44, 43, 43' is normally blocked, and holds pawl 41 in the disengaged position in which shaft 31 freely rotates relative to the power roll 1 which is locked by stop 45 engaging stop wheel 38.

The position of coupling member 40 and pawl 41 relative to control member 43, 43' is determined by the stop 45 which locks stop wheel 38 with power roll 1, coupling member 40 and pawl 41 in a predetermined angular relationship with respect to control means 39, 44, 43, 43'.

Blocking member 46 has an arm 46''' abutting a releasing member 49 under the action of spring 48. Releasing member 49 is a plate having two bores through which pins 54a project. Springs 54 abut washers 54b and releasing member 49 to hold the latter in the position illustrated in FIG. 5. The end of releasing member 49 has an opening through which a portion of a movable armature 51 passes so that releasing member 49 is pivotable against the action of springs 45 so that its upper end is displaced to the left as viewed in FIG. 5. Armature 51 is mounted on a fixed core of electromagnetic means 52 for turning movement about a horizontal axis, so that releasing member 49 can be raised by armature 51 upon energization of electromagnetic means 52 against the action of a spring 53. Electromagnetic means 52 is electrically connected to the switches 14 of all keys 15. A condenser, not shown, is connected in parallel with the winding of electromagnetic means 52 so that upon actuation of any key 15 and closing of the corresponding switch 14, first the armature 7 of the respective electromagnetic means 9 which is correlated with a respective key and type action, is moved to shift the respective element 2 to the operative position cooperating with the power roll 1, whereupon armature 51 is operated with a slight delay to raise releasing member 49 and to pivot blocking member 46 about pivot pin 47 to a releasing position releasing the toothed control wheel 39. The force of electromagnetic releasing means 52 is sufficient to overcome the force of spring 53 and of spring 48 during such movement.

Figure 5:
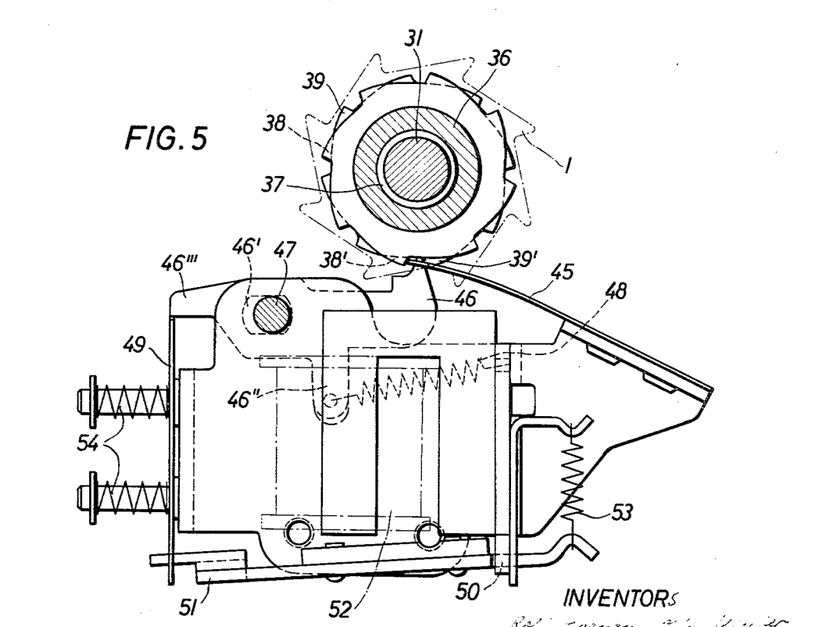
FIG. 5 is a fragmentary cross sectional view taken on line V—V in FIG. 2.

As soon as blocking member 46 releases toothed wheel 39, spring 48 pulls blocking member to the right as viewed in FIG. 5 with pivot pin 47 sliding in slot 46' until arm 46''' slides off the upper end face of releasing member 49 so that the turning moment exerted by spring 48 on blocking member 46 is effective to turn blocking member 46 in counterclockwise direction as viewed in FIG. 5 to a position engaging the back of the tooth of toothed control wheel 39 which was just released by it permitting control wheel 39 to turn one angular step until the shoulder of the next following tooth engages blocking member 46 and is blocked by the same. The end face of arm 46''' is now located on the right side of releasing member 49 as long as the same is still raised.

At the moment in which blocking member 46 releases the shoulder of the previously held tooth of control wheel 39, control means 39, 44, 43, 43' is no longer blocked, and can turn in clockwise direction as viewed in FIGS. 4 and 5. Consequently, spring 42 can turn coupling pawl 41 in a clockwise direction as viewed in FIG. 4, displacing projection 43' and the control means a corresponding small angle until coupling pawl 41 engages the toothed coupling member 33 and couples the continuously rotating drive shaft 31 with power roll 1 which is secured to coupling member 40. Coupling member 40 and power roll 1 start to rotate, while coupling pawl 41, abutting projection 43' turns control means 39, 44, 43 until the point of blocking member 46, which was resting on the back of the respective tooth of control wheel 39, is engaged by the shoulder of the next following tooth of control wheel 39. The next following tooth moves blocking member 46 to the left as viewed in FIG. 5 to the position indicated in chain lines in FIG. 4 until pivot pin 47 is located at the right end of slot 46'.

Since the end face of arm 46''' was located on the right side of releasing member 49, the same is pushed to the left as viewed in FIG. 5 against the action of spring 45. As soon as electromagnetic means 52 is deenergized by release of the respective key 15 and opening of the respective switch 14, armature 51 will be pulled back by spring 53, and releasing member will be pulled down below the level of arm 46''' so that springs 54 can turn releasing member 49 back to the initial position shown in FIG. 5. Of course, if key-operated switch 14 is opened before engagement of blocking member 46 by the next following tooth of control wheel 39 and the consequent shifting of blocking member 46 to the left, then arm 46''' will not engage and turn releasing member 49, but pass above the upper end face of the same. In any event, the original position of the control means and blocking means will be again assumed, with another tooth of control wheel 39 engaged by blocking member 46.

A shoulder of recess 41' of coupling pawl 41 will abut the blocked projection 43' permitting turning of power roll 1 with coupling member 40 through a very small angle while coupling pawl 41 is turned in counterclockwise direction as viewed in FIG. 4 from the coupling position engaging a tooth of coupling member 33 to the position illustrated in FIG. 4 while compressing spring 42. Coupling means 40, 33, 41 is thus disengaged, and pawl 41 abuts coupling member 40. Power roll 1 is stopped by blocking means 46, control means 39, 44, 43, pawl 41, and coupling member 40 which is fixed to power roll 1. At the same moment, a tooth of stop wheel 38 is engaged by the resilient stop 45.

Since the circumferential teeth of control wheel 39 are spaced the same angular distance as the teeth of power roll 1, the power roll will every time turn through an angle corresponding to 360° divided by the number of teeth provided on the power roll and on control wheel 39, in the illustrated embodiment an angle of 45°.

In each turned position of power roll 1, the shoulder of a tooth 1' will always be in exactly the same relative position to the shoulder of projection 2' of element 2. Consequently, upon coupling of drive shaft 31 with power roll 1 by the coupling means 40, 41, 33, element 12 will be immediately engaged by the power roll and cause actuation of the respective type action, or similar device, such as a line spacing device, a back spacing device, a tabulator tab setting and clearing device, or a spacing device.

The apparatus operates as follows:

When the operator depresses any selected key 15, the respective switch 14 is closed and electromagnetic means 9 is immediately energized to turn element 2 about pin 3' to a position in which the shoulder of projection 2' is located directly under the shoulder of a tooth 1' of power roll 1.

The respective switch 14 is connected in series with electromagnetic releasing means 52, as are all other switches 14, so that blocking member 46 releases control means 39, 44, 43, 43' permitting spring 42 to turn coupling pawl 41 to a coupling position in which drive shaft 31 drives power roll 1 through coupling means 40, 41, 33 so that the respective tooth 1' of the power roll engages the shoulder of projection 2' and moves element 2 downward whereby the type action is actuated. Spring 12 pulls element 2 back to its initial position, and spring 10 pulls armature 7 and actuating member 6 back to the initial position upon de-energization of electromagnetic means 9 by the opened switch 14.

When power roll 1 has made almost one-eighth of a turn, blocking member 46, which was sliding on the back of the released tooth of control wheel 39, is engaged by the shoulder of the next folowing tooth so that control means 39, 44, 43, 43' is stopped, holding coupling pawl 41 so that the same is turned out of its coupling position while coupling member 40 with the power roll turns a small angle necessary for the completion of one-eighth of a revolution. When a position corresponding to the initial position of the teeth 1' is reached by power roll 1, stop 45 snaps behind the shoulder of a tooth of stop wheel 38, arresting power roll 1 in the position of readiness illustrated in FIG. 1. Stop 45 prevents turning movement of power roll 1 in a direction of rotation opposite to its rotary movement during actuation of a type action.

Figure 6:
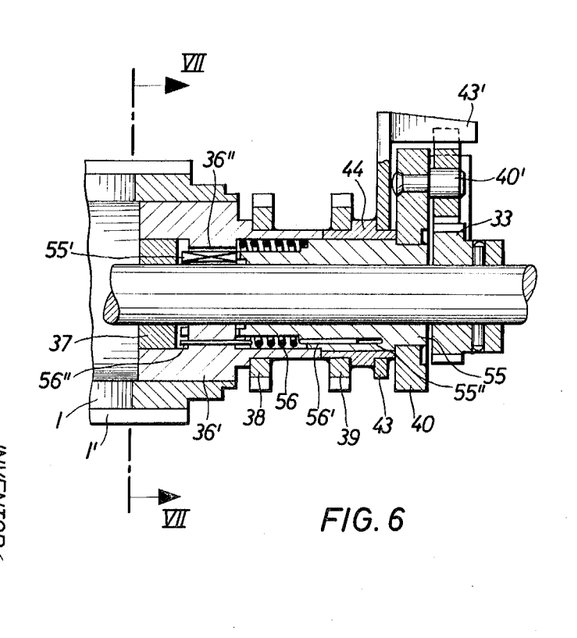
FIG. 6 is a fragmentary axial sectional view illustrating a modified embodiment of the invention.

At the moment in which coupling pawl 41 engages coupling wheel 33, the torque of drive shaft 31 is suddenly transmitted to power roll 1 which causes a certain jerk or jolt. In order to reduce this effect, and to achieve a smoother transmission of the torque, the embodiment illustrated in FIGS. 6 and 7 provides a resilient coupling between coupling member 40 and power roll 1.

The bushing 36 of the embodiment of FIG. 2 is divided into two coupling halves. One coupling half includes an annular member 36' provided with a bearing bushing 37' in which shaft 31 is mounted, and the other coupling half 55 is secured to coupling member 40.

Figure 7:
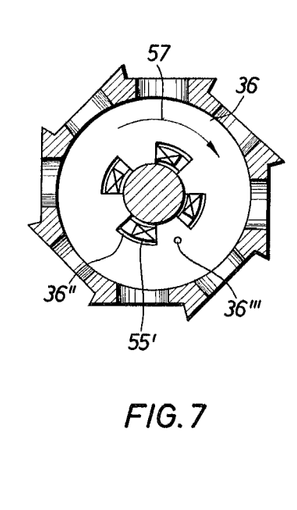
FIG. 7 is a fragmentary cross sectional view taken on line VII—VII in FIG. 6.

Coupling half 55 has at one end a plurality of circumferentially spaced axially extending coupling fingers 55' projecting into corresponding recesses 36" between inner projections of coupling member 36', as best seen in FIG. 7. Coupling fingers 55' are narrower than the recesses 36" so that a limited turning movement between members 36' and 55 is possible, corresponding to a limited turning movement between shaft 31 and power roll 1 when the coupling means 40, 40', 33 is in a coupled position.

A torsion spring 56 connects members 36' and 55 and has ends 56' and 56" respectively secured in bores 36''' of member 36' and 55" of member 55.

During the assembly of the resilient coupling means, member 55 is turned in the direction of rotation of drive shaft indicated by arrow 57 before coupling fingers 55' are inserted into the recesses 36" and in such a manner that spring 56 is tensioned and causes abutment of coupling fingers 55' on one wall of the respective recess 36". Since spring 56 is pretensioned in this manner, the normal torque transmitted from the drive shaft 31 through coupling means 40, 40', 33 and the resilient coupling 37', 36', 56, 55 to power roll 1 will not cause a relative turning between coupling parts 36', 37' and 55, and coupling fingers 55' will remain in the position illustrated in FIG. 7. However, if a greater driving torque is momentarily transmitted, the pretension of spring 56 will be overcome, and coupling fingers 55' will move in recesses 36" in the direction of the arrow 57, further tensioning spring 56 until the resistance of spring 56 will again restore the position shown in FIG. 7 whereby the torque is smoothly transmitted to the power roll.

All features of the embodiment illustrated in FIGS. 1 to 5 are also provided in the embodiment of FIGS. 6 and 7 which substitutes a resilient coupling for the bushing 36 of the embodiment of FIG. 2.

The above described embodiments of the invention employ electromagnetic means energized under manual control, but it will be understood that pneumatic or hydraulic apparatus could be used for the same purpose in which event instead of switches 14, valves will be operated by the keys.

It will be understood that each of the elements described above, or two or more together, may also find a useful application in other types of mechanism for actuating type actions and like devices of a typewriter differing from the types described above.

While the invention has been illustrated and described as embodied in a stepwise operable power roll for an electric typewriter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a typewriter, in combination, a rotatable power roll having teeth spaced the same angular distance in circumferential direction; a drive shaft; means for continuously rotating said drive shaft; coupling means for connecting said drive shaft with said power roll and including a part and a spring biasing said part to move from an inoperative position to a coupling position in which said coupling means couples said power roll with said drive shaft; control means including a turnable control wheel having a plurality of teeth spaced said angular distance in circumferential direction, and a control member secured to said control wheel and engaging said part, said control means being turnable to permit movement of said part to said coupling position, said control member engaging said part so as to be coupled with said power roll in said coupling position so that said power roll turns said control wheel while turning with said drive shaft; blocking means cooperating with successive teeth of said control wheel and normally blocking said control means to hold said part in said inoperative position; and manually controlled releasing means for releasing said blocking means so that said power roll is coupled with said drive shaft and is turned through said angular distance until said blocking means engages the next following tooth of said control wheel and blocks said control means, so that said part moving with said power roll is shifted to said inoperative position by the blocked control means.

2. In a typewriter, in combination, a rotatable power roll having teeth spaced the same angular distance in circumferential direction; a drive shaft; means for continuously rotating said drive shaft; coupling means for connecting said drive shaft with said power roll and including a part and a spring biasing said part to move from an inoperative position to a coupling position in which said coupling means couples said power roll with said drive shaft; control means including a turnable control wheel having a plurality of teeth spaced said angular distance in circumferential direction, and a control member secured to said control wheel and engaging said part, said control means being turnable to permit movement of said part to said coupling position, said control member engaging said part so as to be coupled with said power roll in said coupling position so that said power roll turns said control wheel while turning with said drive shaft; blocking means cooperating with successive teeth of said control wheel and normally blocking said control means to hold said part in said inoperative position; and manually controlled releasing means for releasing said blocking means so that said power roll is coupled with said drive shaft and is turned through said angular distance until said blocking means engages the next following tooth of said control wheel and blocks said control means, so that said part moving with said power roll is shifted to said inoperative position by the blocked control means, said releasing means including a key-operated switch and an electromagnetic means controlled by said switch.

3. In a typewriter, in combination, a rotatable power roll having teeth spaced the same angular distance in circumferential direction; a drive shaft; means for continuously rotating said drive shaft; coupling means for connecting said drive shaft with said power roll and including a coupling member secured to said power roll, a toothed coupling wheel secured to said drive shaft, a pawl mounted on said coupling member, and a spring biasing said pawl toward said coupling wheel to move from an inoperative position to a coupling position in which said coupling means couples said power roll with said drive shaft; control means including a turnable control wheel having a plurality of teeth spaced said angular distance in circumferential direction, and a control member secured to said control wheel and engaging said pawl, said control means being turnable to permit movement of said pawl to said coupling position, said control member engaging said pawl so as to be coupled with said power roll in said coupling position so that said power roll turns said control wheel while turning with said drive shaft; blocking means cooperating with successive teeth of said control wheel and normally blocking said control means to hold said pawl in said inoperative position; and manually controlled releasing means for releasing said blocking means so that said power roll is coupled with said drive shaft and is turned through said angular distance until said blocking means engages the next following tooth of said control wheel and blocks said control means, so that said pawl moving with said power roll and coupling member is shifted to said inoperative position by the blocked control means.

4. In a typewriter, in combination, a rotatable power roll having teeth spaced the same angular distance in circumferential direction; a drive shaft; means for continuously rotating said drive shaft; coupling means for connecting said drive shaft with said power roll and including a part and a spring biasing said part to move from an inoperative position to a coupling position in which said coupling means couples said power roll with said drive shaft; control means including a turnable control wheel having a plurality of teeth spaced said angular distance in circumferential direction, and a control member secured to said control wheel and engaging said part, said control means being turnable to permit movement of said part to said coupling position, said control member engaging said part so as to be coupled with said power roll in said coupling position so that said power roll turns said control wheel while turning with said drive shaft; blocking means including a blocking pawl mounted for turning movement between an inoperative position and a blocking position cooperating with successive teeth of said control wheel and normally blocking said control means to hold said part in said inoperative position, and a spring urging said blocking pawl to said blocking position; and releasing means including a releasing member cooperating with said blocking pawl and manually controlled means for actuating said releasing member to move said blocking pawl to said inoperative position so that said power roll is coupled with said drive shaft and is turned through said angular distance until said blocking means engages the next following tooth of said control wheel and blocks said control means, said part moving with said power roll is shifted to said inoperative position by the blocked control means.

5. An arrangement as set forth in claim 4 wherein said blocking pawl is mounted for translatory movement in said inoperative position, and is biased by said spring to move in said translatory movement away from said releasing member and to turn back to said blocking position to engage the next following tooth of said control wheel.

6. An arrangement as set forth in claim 5 wherein said next following tooth engages said blocking pawl and shifts the same in said translatory movement back to its initial position; and including means for resiliently mounting said releasing member so that the same can be displaced by said blocking pawl during translatory movement.

7. In a typewriter, in combination, a rotatable power roll having teeth spaced the same angular distance in circumferential direction; a drive shaft; means for continuously rotating said drive shaft; coupling means for connecting said drive shaft with said power roll and including a part and a spring biasing said part to move from an inoperative position to a coupling position in which said coupling means couples said power roll with said drive shaft; control means including a turnable control wheel having a plurality of teeth spaced said angular distance in circumferential direction, and a control member secured to said control wheel and engaging said part, said control means being turnable to permit movement of said part to said coupling position, said control member engaging said part so as to be coupled with said power roll in said coupling position so that said power roll turns said control wheel while turning with said drive shaft; blocking means including a blocking pawl mounted for turning movement betwen an inoperative position and a blocking position cooperating with successive teeth of said control wheel and normally blocking said control means to hold said part in said inoperative position, and a spring urging said blocking pawl to said blocking position; and releasing means including a releasing member cooperating with said blocking pawl and manually controlled means for actuating said releasing member to move said blocking pawl to said inoperative position so that said power roll is coupled with said drive shaft and is turned through said angular distance until said blocking means engages the next following tooth of said control wheel and blocks said control means, said part moving with said power roll is shifted to said inoperative position by the blocked control means, said releasing means including a key-operated switch and an electromagnetic means controlled by said switch and having an armature connected wtih said releasing member for operating the same.

8. In a typewriter, in combination, a rotatable power roll having teeth spaced the same angular distance in circumferential direction; a drive shaft; means for continuously rotating said drive shaft; coupling means for connecting said drive shaft with said power roll and including a coupling member secured to said power roll, a toothed coupling wheel secured to said drive shaft, a pawl mounted on said coupling member, and a spring biasing said pawl toward said coupling wheel to move from an inoperative position to a coupling position in which said coupling means couples said power roll with said drive shaft; control means including a turnable control wheel having a plurality of teeth spaced said angular distance in circumferential direction, and a control member secured to said control wheel and engaging said pawl, said control means being turnable to permit movement of said pawl to said coupling position, said control member engaging said pawl so as to be coupled with said power roll in said coupling position so that said power roll turns said control wheel while turning with said drive shaft; blocking means including a blocking pawl mounted for turning movement between an inoperative position and a blocking position cooperating with successive teeth of said control wheel and normally blocking said control means to hold said pawl in said inoperative position, and a spring urging said blocking pawl to said blocking position; and releasing means including a releasing member cooperating with said blocking pawl and manually controlled means for actuating said releasing member to move said blocking pawl to said inoperative position so that said power roll is coupled with said drive shaft and is turned through said angular distance until said blocking means engages the next following tooth of said control wheel and blocks said control means, said pawl moving with said power roll and coupling member is shifted to said inoperative position by the blocked control means.

9. In a typewriter, in combination, a rotatable power roll having teeth spaced the same angular distance in circumferential direction; a drive shaft; means for continuously rotating said drive shaft; coupling means for connecting said drive shaft with said power roll and including a coupling member secured to said power roll, a toothed coupling wheel secured to said drive shaft, a pawl mounted on said coupling member, and a spring biasing said pawl toward said coupling wheel to move from an inoperative position to a coupling position in which said coupling means couples said power roll with said drive shaft; control means including a turnable control wheel having a plurality of teeth spaced said angular distance in circumferential direction, and a control member secured to said control wheel and engaging said pawl, said control means being turnable to permit movement of said pawl to said coupling position, said control member engaging said pawl so as to be coupled with said power roll in said coupling position so that said power roll turns said control wheel while turning with said drive shaft; blocking means including a blocking pawl mounted for turning movement between an inoperative position and a blocking position cooperating with successive teeth of said control wheel and normally blocking said control means to hold said blocking pawl in said inoperative position, and a spring urging said blocking pawl to said blocking position; and releasing means including a releasing member cooperating with said blocking pawl and manually controlled means for actuating said releasing member to move said blocking pawl to said inoperative position so that said power roll is coupled with said drive shaft and is turned through said angular distance until said blocking means engages the next following tooth of said control wheel and blocks said control means, said blocking pawl moving with said power roll and coupling member is shifted to said inoperative position by the blocked control means, said releasing means including a key-operated switch and an electromagnetic means controlled by said switch and having an armature connected with said releasing member for operating the same.

10. In a typewriter, in combination, a rotatable power roll having teeth spaced the same angular distance in circumferential direction; a drive shaft; means for continuously rotating said drive shaft; a toothed stop wheel secured to said power roll and having teeth spaced said angular distance; a resilient stop for engaging said teeth of said toothed stop wheel in angularly turned positions of said power roll for preventing said power roll to turn in a direction opposite to the direction of rotation of said drive shaft; coupling means for connecting said drive shaft with said power roll and including a part and a spring biasing said part to move from an inoperative position to a coupling position in which said coupling means couples said power roll with said drive shaft; control means including a turnable control wheel having a plurality of teeth spaced said angular distance in circumferential direction, and a control member secured to said control wheel and engaging said part, said control means being turnable to permit movement of said part to said coupling position, said control member engaging said part so as to be coupled with said power roll in said coupling position so that said power roll turns said control wheel while turning with said drive shaft; blocking means cooperating with successive teeth of said control wheel and normally blocking said control means to hold said part in said inoperative position; and manually controlled releasing means for releasing said blocking means so that said power roll is coupled with said drive shaft and is turned through said angular distance until said blocking means engages the next following tooth of said control wheel and blocks said control means, so that said part moving with said power roll is shifted to said inoperative position by the blocked control means.

11. In a typewriter, in combination, a rotatable power roll having teeth spaced the same angular distance in circumferential direction; an element movable to and from an operative position adapted to be engaged by one of said teeth of said power roll so as to be actuated by the same for actuating a type action or like device; a drive shaft; means for continuously rotating said drive shaft; coupling means for connecting said drive shaft with said power roll and including a part and a spring biasing said part to move from an inoperative position to a coupling position in which said coupling means couples said power roll with said drive shaft; control means including a turnable control wheel having a plurality of teeth spaced said angular distance in circumferential direction, and a control member secured to said control wheel and engaging said part, said control means being turnable to permit movement of said part to said coupling position, said control member engaging said part so as to be coupled with said power roll in said coupling position so that said power roll turns said control wheel while turning with said drive shaft; blocking means cooperating with successive teeth of said control wheel and normally blocking said control means to hold said part in said inoperative position; releasing means for releasing said blocking means so that said power roll is coupled with said drive shaft and is turned through said angular distance until said blocking means engages the next following tooth of said control wheel and blocks said control means, so that said part moving with said power roll is shifted to said inoperative position by the blocked control means; and manually controlled means connected to said releasing means for actuating the same, and also connected to said element for moving the same to said operative position.

12. In a typewriter, in combination, a rotatable power roll having teeth spaced the same angular distance in circumferential direction; an element movable to and from an operative position adapted to be engaged by one of said teeth of said power roll so as to be actuated by the same for actuating a type action or like device; a drive shaft; means for continuously rotating said drive shaft; coupling means for connecting said drive shaft with said power roll and including a part and a spring biasing said part to move from an inoperative position to a coupling position in which said coupling means couples said power roll with said drive shaft; control means including a turnable control wheel having a plurality of teeth spaced said angular distance in circumferential direction, and a control member secured to said control wheel and engaging said part, said control means being turnable to permit movement of said part to said coupling position, said control member engaging said part so as to be coupled with said power roll in said coupling position so that said power roll turns said control wheel while turning with said drive shaft; blocking means cooperating with successive teeth of said control wheel and normally blocking said control means to hold said part in said inoperative position; releasing means for releasing said blocking means so that said power roll is coupled with said drive shaft and is turned through said angular distance until said blocking means engages the next following tooth of said control wheel and blocks said control means, so that said part moving with said power roll is shifted to said inoperative position by the blocked control means; and manually controlled means including a key, a switch controlled by said key, a first electromagnetic means controlled by said switch and connected to said releasing means for actuating the same, and a second electromagnetic means controlled by said switch and connected to said element for moving the same to said operative position.

13. An arrangement as set forth in claim 12 wherein said blocking means includes a blocking pawl mounted for turning movement between an inoperative position and a blocking position cooperating with said control wheel and mounted for translatory movement in said inoperative position, and a spring urging said blocking pawl to said blocking position and in one direction of translatory movement; and including a releasing member controlled by said first electromagnetic means and cooperating with said blocking pawl to move the same to said inoperative position and being separated from said blocking pawl when same performs said translatory movement.

14. In a typewriter, in combination, a rotatable power roll having teeth spaced in the same angular distance in circumferential direction; a drive shaft; means for continuously rotating said drive shaft; coupling means for connecting said drive shaft with said first power roll and including a resilient coupling having one coupling half secured to said power roll, and including another coupling having a coupling member secured to the other half of said resilient coupling, a toothed coupling wheel secured to said drive shaft, a pawl mounted on said coupling member, and a spring biasing said pawl toward said coupling wheel to move from an inoperative position to a coupling position in which said coupling means couples said power roll with said drive shaft; control means including a turnable control wheel having a plurality of teeth spaced said angular distance in circumferential direction, and a control member secured to said control wheel and engaging said pawl, said control means being turnable to permit movement of said pawl to said coupling position, said control member engaging said pawl so as to be coupled with said power roll in said coupling position so that said power roll turns said control wheel while turning with said drive shaft; blocking means cooperating with successive teeth of said control wheel and normally blocking said control means to hold said pawl in said inoperative position; and manually controlled releasing means for releasing said blocking means so that said power roll is coupled with said drive shaft and is turned through said angular distance until said blocking means engages the next following tooth of said control wheel and blocks said control means, so that said pawl moving with said power roll and coupling member is shifted to said inoperative position by the blocked control means.

15. In a typewriter, in combination, a rotatable power roll having teeth spaced the same angular distance in circumferential direction; a drive shaft; means for continuously rotating said drive shaft; coupling means for connecting said drive shaft with said first power roll and including a resilient coupling having one coupling half secured to said power roll, and including another coupling having a coupling member secured to the other half of said resilient coupling, a toothed coupling wheel secured to said drive shaft, a pawl mounted on said coupling member, and a spring biasing said pawl toward said coupling wheel to move from an inoperative position to a coupling position in which said coupling means couples said power roll with said drive shaft, said resilient coupling including a torsion spring secured to said coupling halves and being pretensioned to hold said coupling halves in an abutting position; control means including a turnable control wheel having a plurality of teeth spaced said angular distance in circumferential direction, and a control member secured to said control wheel and engaging said pawl, said control means being turnable to permit movement of said pawl to said coupling position, said control member engaging said pawl so as to be coupled with said power roll in said coupling position so that said power roll turns said control wheel while turning with said drive shaft; blocking means cooperating with successive teeth of said control wheel and normally blocking said control means to hold said pawl in said inoperative position; and manually controlled releasing means for releasing said blocking means so that said power roll is coupled with said drive shaft and is turned through said angular distance until said blocking means engages the next following tooth of said control wheel and blocks said control means, so that said pawl moving with said power roll and coupling member is shifted to said inoperative position by the blocked control means.

16. An arrangement as set forth in claim 15 wherein said one coupling half of said resilient coupling has recesses bounded by shoulders, and wherein the other coupling half has coupling fingers projecting into said recesses and normally abutting said shoulders.

(References on following page)

References Cited by the Examiner

UNITED STATES PATENTS

| | | | |
|---|---|---|---|
| 1,202,878 | 10/1916 | Morby | 197—17 |
| 1,737,982 | 3/1929 | Stickney | 197—17 |
| 1,921,159 | 8/1933 | Hokanson | 197—17 |
| 2,059,537 | 11/1936 | Salzberger et al. | 197—17 |
| 2,307,942 | 1/1943 | Michelson | 197—17 |
| 2,383,256 | 8/1945 | Kittel | 197—17 |
| 2,875,880 | 3/1959 | Palmer | 197—17 |
| 3,155,215 | 11/1964 | Avery | 197—6.7 |

ROBERT E. PULFREY, *Primary Examiner.*

EDGAR S. BURR, *Assistant Examiner.*